United States Patent
Ducos

(10) Patent No.: US 9,254,912 B2
(45) Date of Patent: Feb. 9, 2016

(54) ANTI-LOFTING DEFLECTOR FOR AIRCRAFT LANDING GEAR

(75) Inventor: Dominique Ducos, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/237,598

(22) PCT Filed: Aug. 20, 2012

(86) PCT No.: PCT/EP2012/066206
§ 371 (c)(1),
(2), (4) Date: Mar. 26, 2014

(87) PCT Pub. No.: WO2013/030030
PCT Pub. Date: Mar. 7, 2013

(65) Prior Publication Data
US 2014/0231584 A1    Aug. 21, 2014

(30) Foreign Application Priority Data
Sep. 2, 2011 (FR) .................................. 11 57775

(51) Int. Cl.
*B64C 25/00* (2006.01)
*B64C 25/32* (2006.01)

(52) U.S. Cl.
CPC ............... *B64C 25/001* (2013.01); *B64C 25/32* (2013.01)

(58) Field of Classification Search
CPC .... B64C 2025/003; B64C 25/16; B64C 25/32
USPC ............ 280/847, 152.05, 156, 157, 159, 160; 172/42, 43
See application file for complete search history.

(56) References Cited

U.S. PATENT DOCUMENTS

| | | | |
|---|---|---|---|
| 3,010,682 A | 11/1961 | Moss et al. | |
| 3,670,996 A | 6/1972 | Jenny | |
| 3,794,383 A * | 2/1974 | France et al. | 298/1 SG |
| 3,802,739 A * | 4/1974 | Knyszel et al. | 298/1 SG |
| 4,408,736 A | 10/1983 | Kirschbaum et al. | |
| 8,864,176 B2 * | 10/2014 | Lasser | 280/851 |
| 2009/0206199 A1 | 8/2009 | Jackson | |

FOREIGN PATENT DOCUMENTS

WO    2010/052447 A1    5/2010

OTHER PUBLICATIONS

International Search Report for PCT/EP2012/066206 dated Nov. 15, 2012.

* cited by examiner

*Primary Examiner* — Tien Dinh
*Assistant Examiner* — Michael A Fabula
(74) *Attorney, Agent, or Firm* — Sughrue Mion, PLLC

(57) ABSTRACT

An anti-lofting deflector for landing gear having two wheels on an axle. The deflector comprises a stationary support (5) for being fastened in service to a portion of the landing gear that carries the axle in order to extend between the wheels and present a distal end behind the wheels. It also has a first flap (2) hinged to the support via its distal end about a first hinge axis (X1) substantially parallel to the axle and a second flap (3) hinged to the first flap about a second hinge axis (X2) substantially parallel to the first hinge axis. Finally, there is a a return member (11) arranged so as to urge the second flap against an abutment of the first flap that prevents the second flap from becoming aligned with the first flap, and to urge the first flap against an abutment of the stationary support that prevents the first flap from folding against the support.

6 Claims, 3 Drawing Sheets

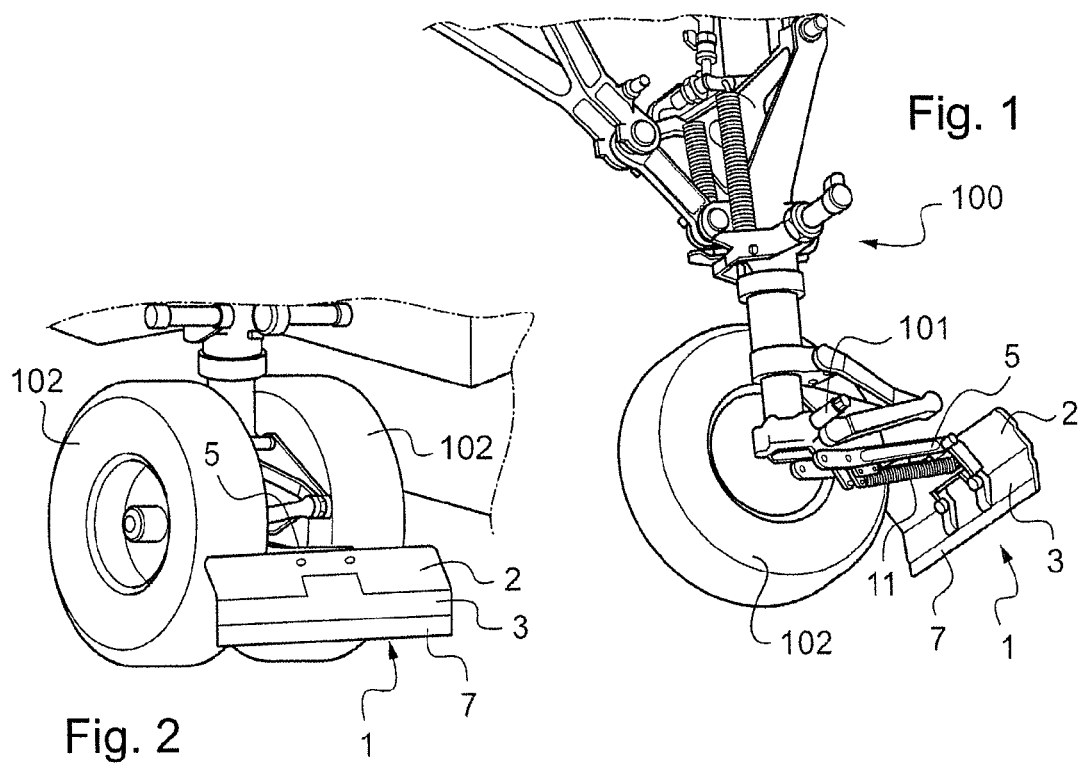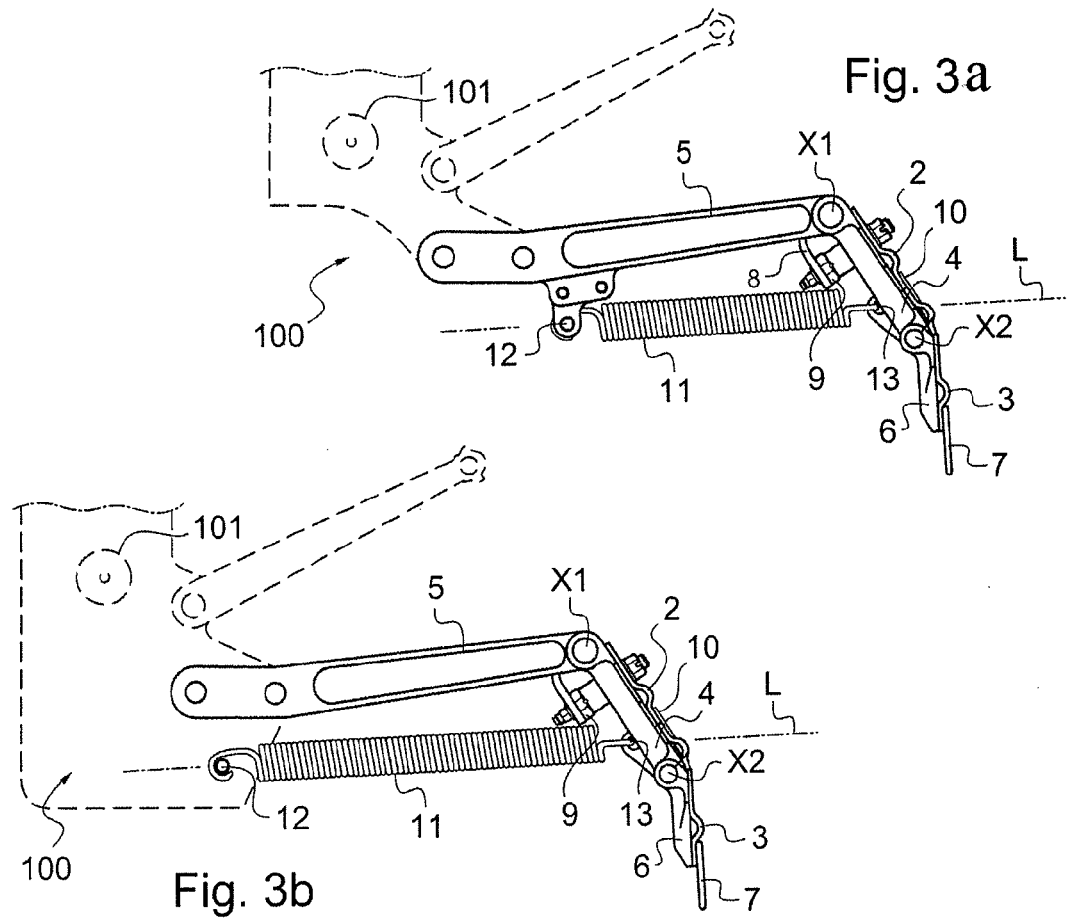

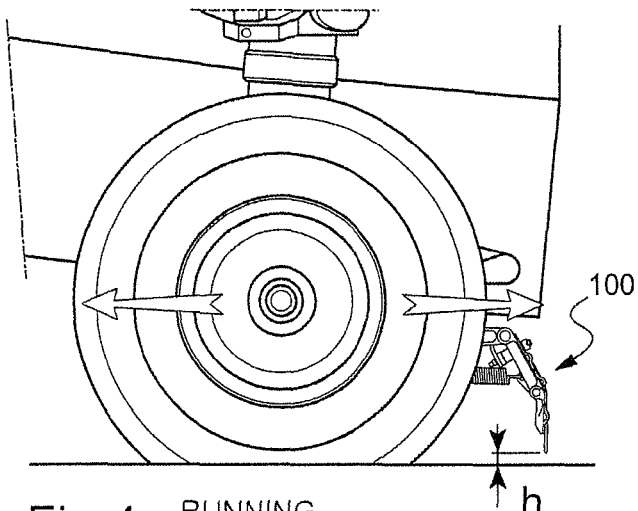
Fig.4  RUNNING TIRES INFLATED
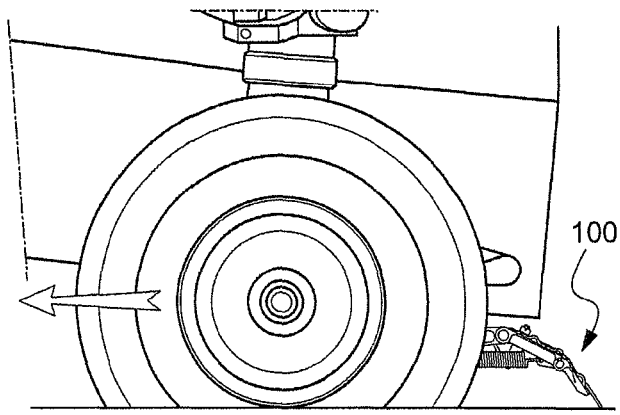
RUNNING FORWARD TIRES FLAT  Fig.5
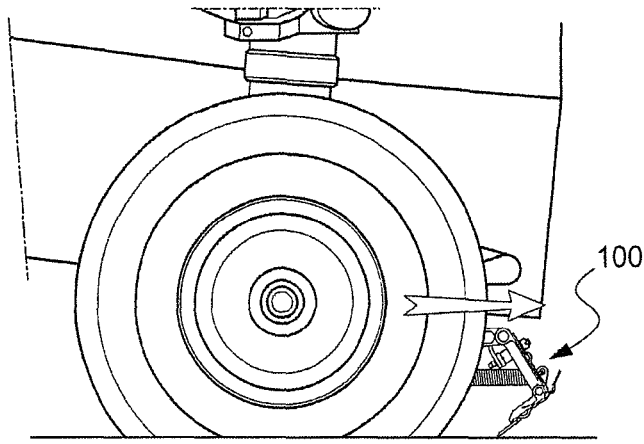
Fig.6  RUNNING BACKWARDS TIRES UNDER INFLATED OR HEAVY STATIC LOAD

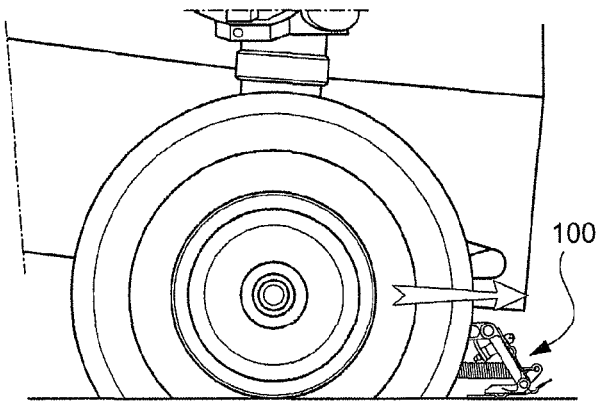
Fig. 7  RUNNING BACKWARDS TIRES FLAT
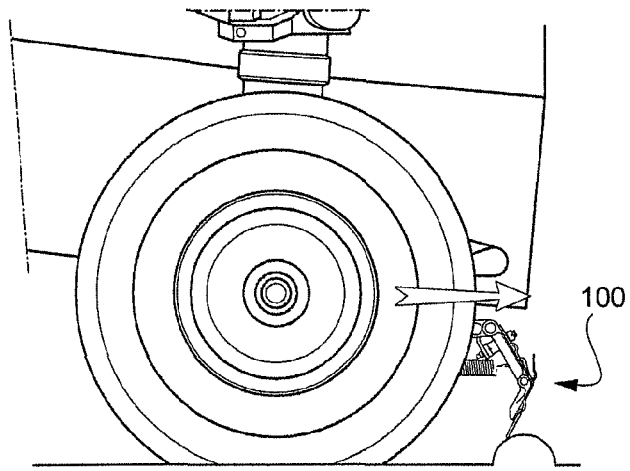
RUNNING BACKWARDS TIRES INFLATED WITH AN OBSTACLE  Fig. 8
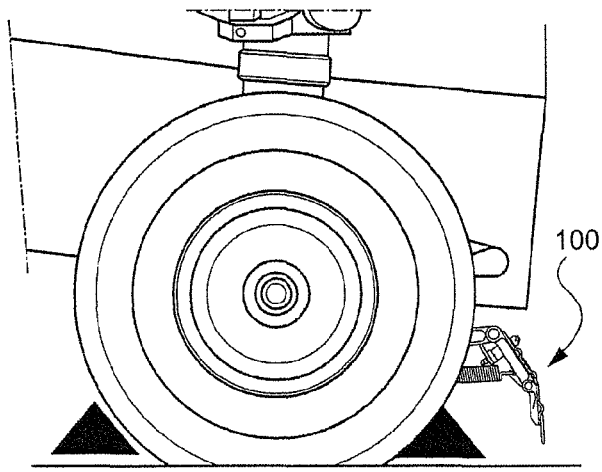
Fig. 9  STATIONARY TIRES INFLATED, CHOCKS IN PLACE

ANTI-LOFTING DEFLECTOR FOR AIRCRAFT LANDING GEAR

The invention relates to an anti-lofting deflector for aircraft landing gear, and to landing gear fitted with such a deflector.

TECHNOLOGICAL BACKGROUND OF THE INVENTION

Some kinds of landing gear are fitted with deflectors to prevent stones or debris being thrown up or "lofted" by the tires while the aircraft is running on the ground.

Such deflectors are commonly mounted in particular on the nose landing gear of Russian fighters such as the MIG 23 or the MIG 29, where such landing gear has two wheels on a common axle. The deflectors are then in the form of a flap extending behind the tires of the landing gear and mounted to pivot about an axis that coincides with the axis of the axle, the deflector also being connected by a rod to a fixed point on the main strut of the landing gear. Thus, the greater the extent to which the shock absorber of the landing gear is pushed in (which corresponds to a large static load on the landing gear and thus to an increased risk of stones being lofted), the closer the flap of the deflector approaches the ground.

Nevertheless, clearance must necessarily be maintained between the ground and the bottom of the flap in order to prevent the flap from scraping the ground and being damaged, or indeed from preventing the aircraft from being movable rearwards (e.g. when pushed by a tractor). The need to take account of the potential of the tires being under-inflated has led to providing a large amount of clearance between the ground and the bottom of the flap, thereby reducing the effectiveness of the deflector.

OBJECT OF THE INVENTION

An object of the invention is to provide an anti-lofting deflector for aircraft landing gear with improved effectiveness.

BRIEF SUMMARY OF THE INVENTION

In order to achieve this object, the invention provides an anti-lofting deflector for landing gear having two wheels on an axle, the deflector comprising:

- a stationary support for being fastened in service to a portion of the landing gear that carries the axle in order to extend between the wheels and present a distal end behind the wheels;
- a first flap hinged to the support via its distal end about a first hinge axis substantially parallel to the axle;
- a second flap hinged to the first flap about a second hinge axis substantially parallel to the first hinge axis; and
- a return member arranged so as to urge the second flap against an abutment of the first flap that prevents the second flap from becoming aligned with the first flap, and to urge the first flap against an abutment of the stationary support that prevents the first flap from folding against the support.

In a preferred embodiment, the return member comprises a spring coupled between the second flap and a stationary point of the support or of the landing gear, the spring extending along a line of action that passes between the hinge axes.

BRIEF DESCRIPTION OF THE FIGURES

The invention can be better understood in the light of the following description of a particular, non-limiting embodiment of the deflector of the invention given with reference to the figures of the accompanying drawings, in which:

FIG. 1 is a perspective view of an aircraft nose landing gear fitted with a deflector of the invention, one of the wheels being omitted for clarity in the figure;

FIG. 2 is a rear perspective view of the landing gear shown in FIG. 1;

FIGS. 3a and 3b are side views of the deflector fitted to the landing gear of FIGS. 1 and 2; and FIGS. 4 to 9 are side views of the landing gear of FIGS. 1 and 2 in various situations for the aircraft on the ground.

DETAILED DESCRIPTION OF AN EMBODIMENT OF THE INVENTION

With reference to FIGS. 1 and 2, the deflector 1 of the invention is shown in position on a nose landing gear 100 having an axle 101 carrying two wheels 102 fitted with tires. The deflector 1 comprises a flap 2 that extends behind the wheels, this first flap 2 being extended downwards by a second flap 3 having a mudflap 7.

As can be seen particularly in FIGS. 3a and 3b, the first flap 2 has a frame 4 that is hinged to the distal end of a support 5 about a first hinge axis X1 that is substantially parallel to the axis 101, which support 5 has its proximal end fastened to the landing gear, between the wheels that it carries. The second flap 3 has a frame 6 that is hinged to the frame 4 of the first flap 2 about a second hinge axis X2 that is substantially parallel to the first hinge axis X1.

The support 5 has an abutment 8 against which a stop member 9 (in this example a finger of adjustable length) that is secured to the frame 4 comes into contact in order to define an angular position in which the first flap 2 stops relative to the support 5 so that the first flap 2 cannot fold against the support 5. Likewise, the second flap 3 has an extension 10 that forms a stop member coming into contact against the back of the first flap 2, thereby forming an abutment defining an angular position in which the second flap 3 is stopped relative to the first flap 2, such that the second flap 3 cannot become aligned with the first flap 2.

A return member, specifically in this example a spring 11, is coupled between a stationary point 12 secured to the support 5 (it could be secured directly to the landing gear), and the end of a lever 13 secured to the frame 6 of the second flap 3. As can be seen in the figure, the line of action L of the spring passes between the hinge axes X1 and X2, such that the spring 11 serves simultaneously to urge the first flap 2 against the abutment 8 of the support 5 and to urge the extension 10 of the second flap 3 against the back of the first flap 2.

The operation of the deflector of the invention is shown in FIGS. 4 to 9 for various situations when running on the ground:

FIG. 4 shows taxiing (forwards or backwards) with the tires properly inflated, for an average static load. It can thus be seen that the end of the mudflap 7 is very close to the ground but without actually touching it, being at a height h above the ground of about 20 millimeters (mm), thereby serving to stop most lofted debris.

FIG. 5 shows a forward taxiing situation with the tires completely deflated or burst. It can be seen that the mudflap 7 presses against the ground, causing the second flap 3 to be in abutment against the first flap 2 and causing the second flap 2 to move away from the support 5 against the spring 11.

FIG. 6 shows a situation of taxiing rearwards with the tires fully deflated or burst. It can be seen that the mudflap 7 bears against the ground, thereby ensuring the first flap 2 is in abutment against the support 5 and is causing the second flap 3 to fold relative to the first flap 2 against the spring 11.

FIG. 7 shows a situation of taxiing rearwards with the tires deflated. The second flap 3 is folded to such an extent as to be almost parallel to the ground.

FIG. 8 shows a situation of taxiing rearwards with the tires properly inflated, and the mudflap striking against an obstacle on the ground. Under such circumstances, and as shown, the second flap 3 folds towards the first flap 2 against the spring 11 so as to move out of the way and thus pass over the obstacle. In contrast, when taxiing forwards, it would be the first flap 2 that moves away from the support 5 against the spring 11.

FIG. 9 shows a situation in which the aircraft is stationary, with chocks placed against the tires to prevent the aircraft from moving. It can be seen that sufficient space extends between the tires and the deflector to allow a chock to be inserted therein.

Naturally, the invention is not limited to the above description, but covers any variant coming within the ambit defined by the claims. In particular, although the return member in this example comprises a spring coupled between the second flap and a stationary point of the support or the landing gear, in a variant it is possible to use a return member comprising two torsion springs arranged respectively between the support and the first flap, and between the first flap and the second flap, each of the torsion springs urging the first and second flaps towards their respective abutments.

The invention claimed is:

1. An anti-lofting deflector for landing gear having two wheels on an axle, the deflector comprising:
    a stationary support (5) for being fastened in service to a portion of the landing gear that carries the axle in order to extend between the wheels and present a distal end behind the wheels;
    a first flap (2) hinged to the support via its distal end about a first hinge axis (X1) substantially parallel to the axle;
    a second flap (3) hinged to the first flap about a second hinge axis (X2) substantially parallel to the first hinge axis; and
    a return member (11) arranged so as to urge the second flap against an abutment of the first flap that prevents the second flap from becoming aligned with the first flap, and to urge the first flap against an abutment of the stationary support that prevents the first flap from folding against the support.

2. An aircraft landing gear comprising an anti-lofting deflector as defined in claim 1.

3. The aircraft landing gear as recited in claim 2, wherein said landing gear is nose landing gear.

4. An anti-lofting deflector for landing gear having two wheels on an axle, the deflector comprising:
    a stationary support (5) for being fastened in service to a portion of the landing gear that carries the axle in order to extend between the wheels and present a distal end behind the wheels;
    a first flap (2) hinged to the support via its distal end about a first hinge axis (X1) substantially parallel to the axle;
    a second flap (3) hinged to the first flap about a second hinge axis (X2) substantially parallel to the first hinge axis; and
    a return member (11) arranged so as to urge the second flap against an abutment of the first flap that prevents the second flap from becoming aligned with the first flap, and to urge the first flap against an abutment of the stationary support that prevents the first flap from folding against the support,
    wherein the return member comprises a spring (11) coupled between the second flap and a stationary point of the support or of the landing gear, the spring extending along a line of action (L) that passes between the hinge axes (X1, X2).

5. An aircraft landing gear comprising an anti-lofting deflector as defined in claim 4.

6. The aircraft landing gear as recited in claim 5, wherein said landing gear is nose landing gear.

\* \* \* \* \*